UNITED STATES PATENT OFFICE.

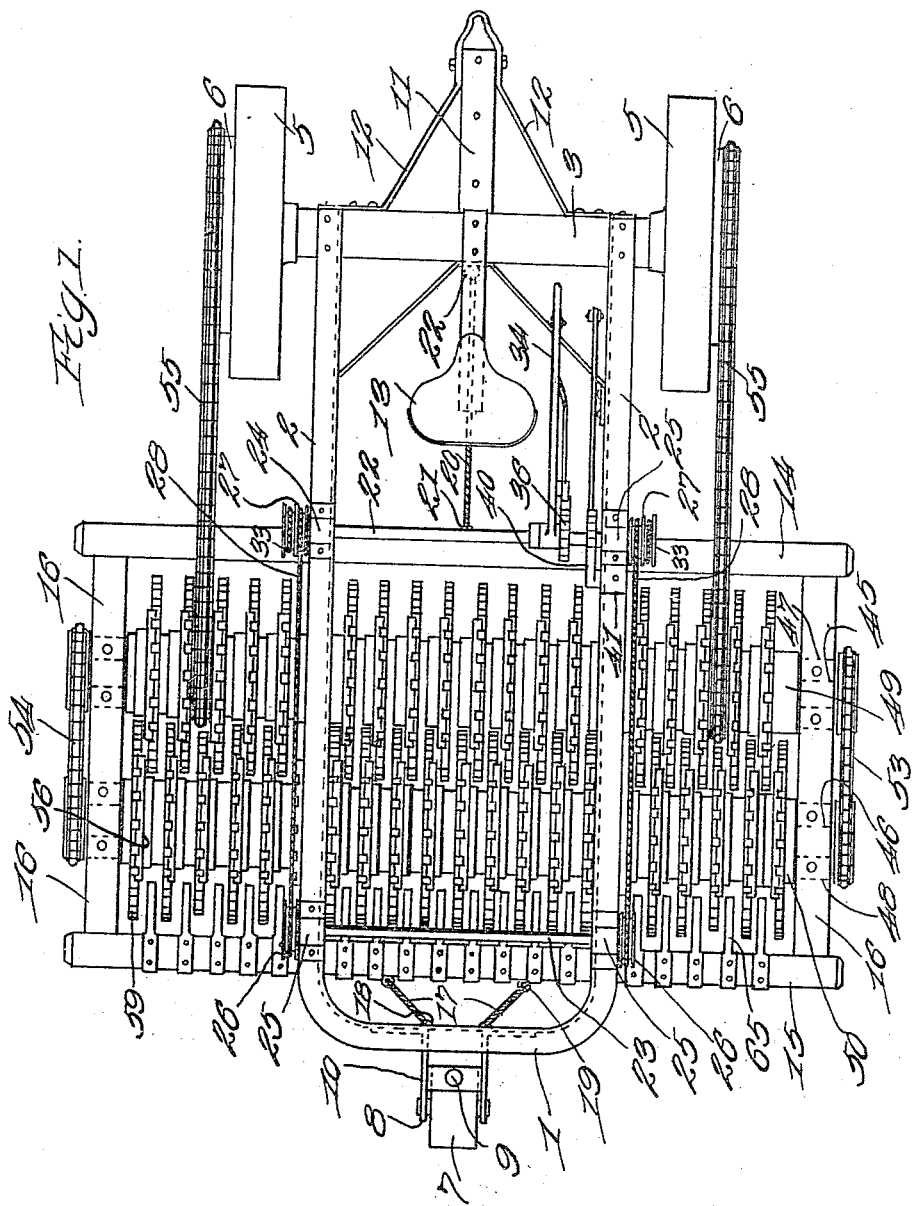

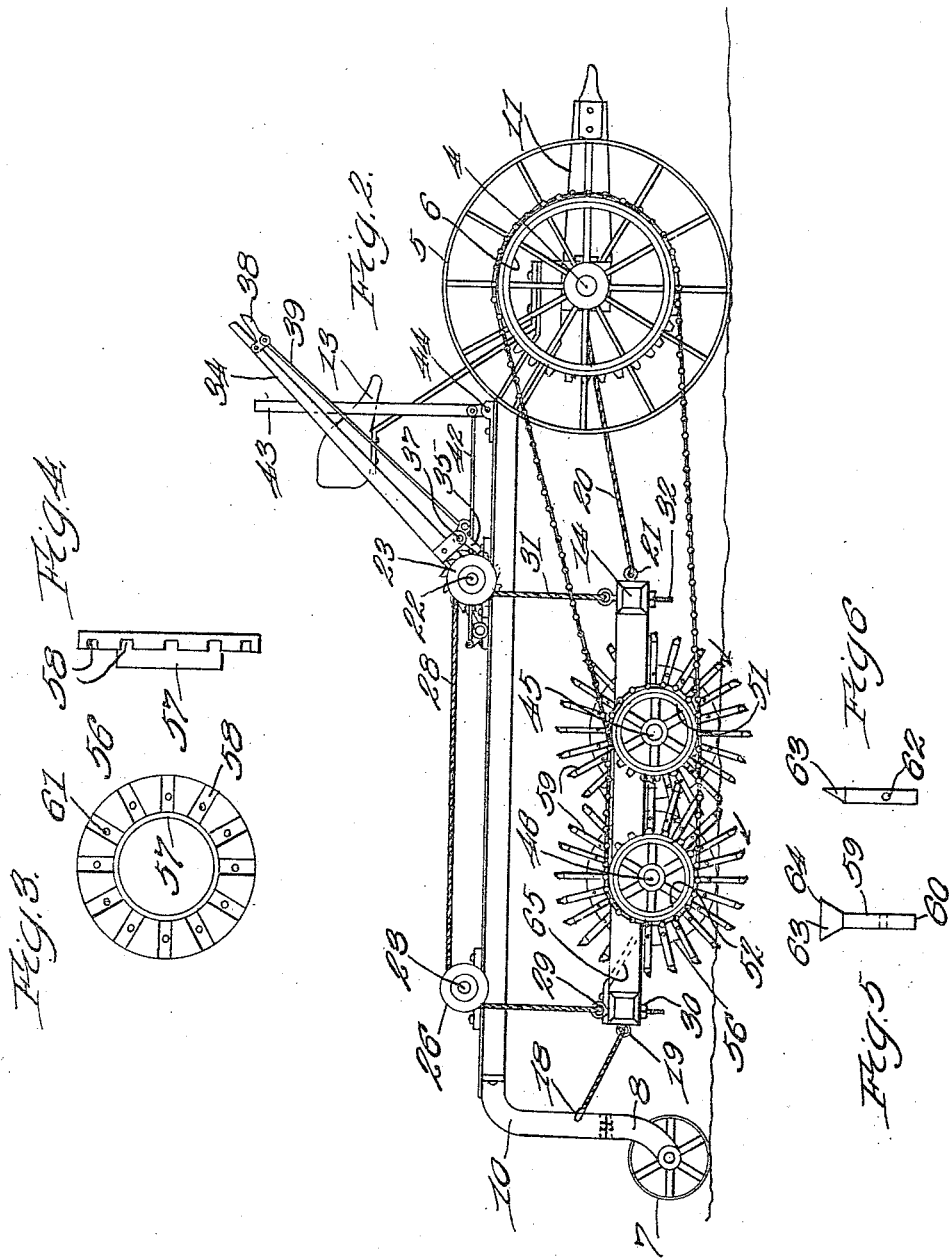

WILLIAM F. MENZENBACH, OF ELK RIVER, IDAHO.

WEEDER AND CULTIVATOR.

1,244,531.  Specification of Letters Patent.  Patented Oct. 30, 1917.

Application filed April 12, 1917. Serial No. 161,656.

*To all whom it may concern:*

Be it known that I, WILLIAM F. MENZENBACH, a citizen of the United States, residing at Elk River, in the county of Clearwater, State of Idaho, have invented new and useful Improvements in Weeders and Cultivators, of which the following is a specification.

This invention relates to improvements in weeders which are so designed and constructed that they also perform the function of a cultivator.

In weeding fine ash soil of the powdered fineness such as is common in the Northwest, it is highly desirable not to break up and comminute the surface clods and lumps for the reason that the latter serve to prevent the soil from being blown away by high winds. On the other hand, in heavy soil, it is desirable to break up the surface as much as possible.

Now it is one of the features of my invention to provide a weeder which is adjustable for use in various kinds of soil so that it may perform its weeding function with equal facility and efficiency in any variety of soil without cultivating such soil in a manner contrary to what has been considered the customary and best methods.

In this connection, my improved weeder functions not only to uplift and elevate the weeds but also to break up, sever and crush the same in such a manner that they will not only be readily plowed under without supporting the furrows in a manner to leave air gaps, but also, so that the weeds will be exposed to the sun in their broken state in such a manner that they will quickly rot and thereby become useful as fertilizer.

My invention includes flexible means for supporting a weeder frame from a main frame, the weeder frame having weeding cylinders mounted thereon whereby the weeder frame will be capable of either bodily or end elevation when the weeders encounter obstacles thereby enabling the weeder frame to ride over such obstructions, because of the flexible suspension and avoiding the necessity of special adjustment.

In many cases, it is desired to have the foremost weeder adjusted to weed shallow while the following weeder is adjusted to weed relatively deep, and it is a feature of my invention to not only provide for such adjustment but to also elevate and lower the weeder frame without disturbing such adjustment.

My invention includes the novel idea of connecting the rotating weeders up with front rotating members in order to drive the weeders, and this drive connection is not only used as a drive, but also as a means for maintaining the flexibly supported weeder frame in a predetermined position either while the machine is advancing in a straight course or when it is rounding a curve or turn. In this connection, my improved weeder comprises a frame which is supported at its rear end by a caster bearing wheel and which is supported at its front end by bearing wheels which are always parallel with the longitudinal axis of the machine, the tongue being fixed to the machine whereby turns are rounded or negotiated because of the presence of the caster bearing wheel.

Other features and objects of the invention will be more fully described in connection with the accompanying drawings and will be more particularly pointed out in and by the appended claims.

In the drawings:—

Figure 1 is a plan view of one form of my invention.

Fig. 2 is a view in side elevation thereof.

Fig. 3 is a face view of one of the spike holding cylinder rings.

Fig. 4 is an edge view thereof.

Fig. 5 is a detached view of one of the weeding members showing the flat side of a chisel like weeding end.

Fig. 6 is a view in side elevation thereof.

Like characters of reference designate similar parts throughout the different figures of the drawings.

In the form shown, a main frame is provided which is of substantially U-shaped form having a bight 1 and limbs 2. At the front of the machine the limbs 2 are rigidly secured to a bolster 3 to the latter of which an axle 4 is journaled in such a manner as to be held against movement from a right angle position to the longitudinal axis of the machine. A pair of front bearing wheels 5 are mounted upon the axle 4 and each bearing wheel has fixed thereto a sprocket wheel 6, the purpose of which will presently appear. The rear end of the frame is supported by a caster bearing wheel 7 which is journaled in a fork 8. The fork 8 is swiveled by pivot 9 to a bracket 10 which latter depends from the bight 1. A tongue 11 is fixed to the bolster 3, and may be braced, as indicated at 12, the machine being capable of being turned around a curve because of the presence of the caster wheel 7. A driver's seat is shown at 13.

Suspended below the main frame, and between the front and rear bearing wheels, is a weeder frame which is formed of relatively long front and rear timbers or members 14 and 15, respectively, which are connected by relatively short lateral members 16. Said weeder frame is provided with flexible connections 17 which are united at 18, to the bracket 10, and which are disposed in diverging relation so that their opposite terminals may be connected at 19, with member 15, of the weeder frame, to resist lateral swaying movement of said frame and also to prevent displacement of the frame when the machine is being backed up. A flexible connection 20 is united at 21 to the front member 14, and at 22, to the bolster 3, to hold said weeder frame in position against the resistance of drag.

I will next refer to the manner in which the weeder frame is suspended, pendently, from the main frame.

Actuating and idler shafts 22 and 23, respectively, are journaled in bearings 24 and 25, respectively, which bearings are mounted upon the limbs of the main frame. The shaft 23 carries sheaves 26 and the shaft 22 carries sheaves 27. Flexible lines, such as ropes or cables 28 are trained about sheaves 27 so as to be wound up thereon and are stiffly reeved over sheaves 26. The lower terminals of said cables 28 are adjustably connected to the rear member 15 by bolts 29 and the bolts 29 are provided with nuts 30 whereby the bolts may be adjusted so as to control the depth of dig of the weeding members. Flexible lines such as ropes or cables 31 are adjustably connected to the front member 14 by bolts 32 whereby adjustment of the front end of the weeder frame may be effected. Thus it will be seen that adjustment is provided whereby the front end of the weeder frame may be elevated with respect to the rear end to cause the foremost weeder to dig shallow while the rearmost weeder digs relatively deep. The cables 31 are wound about sheaves 33, on shaft 22 so that when shaft 22, which may be termed the adjusting shaft, is rotated, the cables 28 and 31 will be simultaneously wound up on the sheaves 27 and 33 to synchronously elevate the weeder frame at points forwardly and rearwardly thereof. Furthermore, if the weeder frame should strike an obstruction, these flexible connections, together with the flexible connections 17 and 20, would permit the weeder frame to rise up, until the obstruction has passed, whereupon the weeder frame would descend by gravity to its normal position. This avoids special adjustment and stopping of the machine when there is encountered obstructions which with other forms of weeders necessitate adjustment or stopping.

A hand actuated lever 34 is loosely journaled on shaft 22 and is provided with a pawl 35 for engagement with ratchet teeth 36, of a ratchet wheel which is fixed on shaft 22. The pawl is pivoted at 37, to the lever 34, and is actuated by a hand grip lever and rod device 38 and 39, of common construction. In order to lock shaft 22 in its adjusted position, a locking pawl 40, pivoted to the frame at 41, is adapted to be actuated by a link 42 connected with a lever 43. The lever 43 is pivoted at 44 to the frame 1. This locking pawl 40 automatically locks the shaft 22 in adjusted position but if it is desired to lower the weeder frame, it will be seen that the lowering action may be controlled by lever 34 after locking pawl 40 is released.

I will next describe the improved weeding cylinders.

Cylinder shafts 45 and 46 are journaled in suitable bearings 47 and 48 which latter are mounted upon the members 16. Cylinders 49 and 50 are mounted on said shaft. Each shaft has, on each end thereof, sprocket wheels 51 and 52 and chains 53 and 54 are trained over said sprocket wheels so as to cause the cylinders to rotate in unison when the cylinders are driven. The front cylinder 49 has sprocket wheels over which chains 55 are trained, said chains 55 extending forwardly where they are trained over sprocket wheel 6. Now it will be seen that the chains 55 are laterally disposed with respect to the longitudinal center of the machine and thus any drag on the weeding frame will be taken up centrally, by the flexible connection 20, and will be taken up laterally, by the chains 55. This will not keep the chain 55 taut but it will also be seen that the chain 55 will prevent the weeder frame from swinging laterally about the central tension connection 20. Thus when the weeder rounds a curve, the chains 55 will maintain the weeder frame in a predetermined position just the same as when the machine is being advanced in a straight course. Chains 55 constitute transmission means for rotating the cylinders 49 and 50, the chains 53 and 54 communicating rotary transmission from the cylinder 49 to the cylinder 50.

I will next describe the weeding members and the manner in which the weeding members are mounted upon the cylinders.

A plurality of weeder holding disks 56 are suitably fixed upon the cylinders in the desired spaced relation, the disks having hubs 57 which fit tightly on the cylinder.

Laterally of the disks 56 are radially disposed grooves 15 into which weeding spikes 59 are adapted to be inserted. The inner ends 60 of the spike 59 will abut against the peripheries of the hubs 57 and single bolt holes 61 which register with bolt holes 62 permit of locking the weeder members on their disks with single bolts. I preferably provide the weeding members with diverging chisel shaped terminals 63 which not only present a sharp edge 64 but which are of sufficient area to agitate the surface of the soil, whereby cultivating action will be effected. The cylinders are sufficiently close together so that the weeding members will over-lap or intermesh, as will be clearly seen by reference to Figs. 1 and 2, so that when the diggers or weeders have elevated a weed, the weed will be mutilated and broken up by reason of the oppositely moving intermeshing members. Thus the weeding members of the front cylinder will always be clear. However, if the weeding members of the rear cylinder should carry fragments of weeds over and downwardly, I provide means such as clearing fingers 65, mounted on member 50, and which project between the members of the rear cylinder, to clear the latter. Thus it will be seen that the weeding members are self-clearing.

It is believed that the advantages and utility of my invention will be fully appreciated from the foregoing description, and while I have herein shown and described one specific form of my invention, I do not wish to be limited thereto except for such limitations as the claims may import.

I claim:

1. In a weeder and cultivator, a main frame having a caster bearing wheel at the rear thereof, an axle fixed to the front of said frame against movement from a right angle position to the longitudinal axis of the machine, bearing wheels for said axle, a tongue fixed to the machine, a weeder frame between the front and rear bearing wheels, weeder cylinders rotatively mounted in said weeder frame and having weeding members projecting radially therefrom, adjustable flexible mechanism for supporting said weeder frame from said main frame, flexible means connecting said weeder frame fore and aft with said main frame, means for causing said cylinders to rotate in unison when driven, and transmission means drivingly connecting one of said cylinders with the front bearing wheels at lateral points along the length of such cylinder whereby said weeder frame will be held against movement from a predetermined position under drag either when the weeder is being advanced in a straight course or when rounding a turn, substantially as described.

2. In a weeder and cultivator, a main frame having a caster bearing wheel at the rear thereof, an axle fixed to the front of said frame against movement from a right angle position to the longitudinal axis of the machine, bearing wheels for said axle, a tongue fixed to the machine, a weeder frame, weeder cylinders rotatively mounted in said weeder frame and having weeding members projecting therefrom, flexible mechanism for supporting said weeder frame in suspended relation below said main frame, means for causing said cylinders to rotate in unison when driven, and transmission chains disposed on opposite sides of the longitudinal axis of the machine for driving one of said cylinders from said front bearing wheels whereby drag on the weeding frame will not only maintain said chains taut when the machine is advancing in a straight course or rounding a curve and whereby said chains will hold said weeder frame to a predetermined position either on a straight course or when rounding a curve, substantially as described.

In testimony that I claim the foregoing as my own, I hereby affix my signature.

WILLIAM F. MENZENBACH.

Copies of this patent may be obtained for five cents each, by addressing the "Commissioner of Patents, Washington, D. C."